United States Patent Office.

MANN S. VALENTINE, OF RICHMOND, VIRGINIA.

Letters Patent No. 114,234, dated April 25, 1871.

IMPROVEMENT IN PREPARING AN EXTRACT OF MEAT.

The Schedule referred to in these Letters Patent and making part of the same.

I, MANN S. VALENTINE, of the city of Richmond, in the county of Henrico and State of Virginia, have invented a new and useful Method and Process of Treating or Preparing Meat and other articles of food or remedial agents.

The following is a specification of my said method and process.

Nature and Objects of the Invention.

In order to obtain from meat or other article of food or remedial agent the nutritious juices or valuable constituents in the most desirable condition to adapt them for absorption and nutriment, I apply to the material a moderate heat, which will not coagulate the albuminous matter, for a sufficient period to permit a ready and thorough separation of the desired juices from the grosser or non-nutritious parts, the said juices being then removed by straining or pressing them out of the solid matter.

Water or other suitable solvent may be used in applying my process to farinaceous or other dry food, but with meat this is not required.

General Description.

To obtain the nutritious juices of meat the process is as follows:

Take one pound of lean beef, free from fat, and grind it well in a meat-grinder. Sprinkle on the meat ten grains of table-salt and mix it in the mass, giving the salt fifteen minutes to penetrate the meat and come in contact with the liquids contained. Season with cayenne-pepper somewhat more than one would use at table. Then put the beef in a warm pan on a good steady fire, either with or without the intervention of a water-bath; briskly and uninterruptedly stir it to and fro over the pan, that the entire mass shall be equally heated at a temperature below 140°, the point of coagulation of albumen.

When the meat has assumed a grayish hue throughout the mass, which happens in from five to ten minutes, according to the state of the fire, it has then reached its highest point in the process, and is ready to yield up its liquids, which presently ooze out into the pan.

Then remove the pan from the fire, and with expedition turn its contents of meat and liquids into a strong cloth bag held over a bowl, and compactly gathering the folds of the bag upon the meat proceed to apply such pressure as will express all the liquids contained in the meat out into the bowl, and there is left behind in the bag a hard cake of tough exhausted flesh.

In from one to two minutes time the liquid will settle and a small deposit fall to the bottom of the bowl. Pour off and let it cool. When cool, skim any grease that may have formed at the top, and you then have my new meat preparation, which I term "the germ of life or nutritive principle."

The quantity of this liquid that a pound of beef yields by this process will vary according to the quality of the beef, the portion of the animal used, and the contingencies of time and weather, say from five and a half to six and a half ounces.

From the above description of my mode of treating meat, the manner of employing my invention to obtain the nutritious elements of farinaceous or other food will be readily understood; but in the case of dry food or any food which does not contain sufficient fluid when subjected to a moderate heat, water or other suitable solvent is used to permit the separation of the nutritious matter by the warming and straining or expressing process.

I do not desire to limit my claim to any particular product or material, but wish to apply my process to any article to which it may be well adapted.

I have applied it with good effect to the preparation of corn-starch for children and invalids.

I also evaporate water from the various solutions, and keep them in a semi-solid state.

Preparations produced by my new method differ from what has been heretofore known in this important particular.

In other articles of food, whether cooked in the usual way or prepared by condensing or by the formation of essences or extracts for the use of the sick or for keeping or transportations, the albuminous element of the food is administered in a coagulated state and requires reassimilation, while by my process the important histogenetic principles as well as the other elements of nutrition held in solution, such as the organic and inorganic extractions and the inorganic compounds found in the blood, are all presented to the stomach uncoagulated and ready for immediate absorption.

Claims.

I claim as my invention—

1. The method described for obtaining the juices of meat or other matter in a condition ready for assimilation and nutrition by expressing the said juices after the material has been subjected to a moderate heat so as to avoid coagulating the albumen.

2. The new article of food above described, consisting of the juice of meat expressed after the application of moderate heat, such as will not coagulate the albumen.

MANN S. VALENTINE.

Witnesses:
 RO. HOWARD,
 JNO. S. WISE.